(12) United States Patent
Mannaru et al.

(10) Patent No.: US 7,308,476 B2
(45) Date of Patent: Dec. 11, 2007

(54) METHOD AND SYSTEM FOR PARTICIPANT AUTOMATIC RE-INVITE AND UPDATING DURING CONFERENCING

(75) Inventors: Durga D. Mannaru, Raleigh, NC (US); Vivekanand Vellanki, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 10/709,512

(22) Filed: May 11, 2004

(65) Prior Publication Data

US 2006/0031290 A1    Feb. 9, 2006

(51) Int. Cl.
G06F 15/16 (2006.01)
H04M 3/42 (2006.01)
H04N 7/14 (2006.01)
H04N 7/173 (2006.01)

(52) U.S. Cl. ............ 709/204; 379/202.01; 379/210.01; 348/14.08; 348/14.09; 348/14.12; 725/89; 725/102; 725/134; 709/205

(58) Field of Classification Search ............... 709/204, 709/205; 379/202.01, 210.01; 348/14.08, 348/14.09, 14.12; 725/89, 102, 134
See application file for complete search history.

(56) References Cited

U.S. PATENT DOCUMENTS

| | | | |
|---|---|---|---|
| 4,540,850 A * | 9/1985 | Herr et al. ............... | 379/88.19 |
| 5,440,624 A * | 8/1995 | Schoof, II .............. | 379/202.01 |
| 5,559,875 A | 9/1996 | Bieselin et al. | |
| 5,710,591 A | 1/1998 | Bruno et al. | |
| 5,754,776 A | 5/1998 | Hales, II et al. | |
| 5,764,278 A | 6/1998 | Nagao | |
| 5,802,282 A | 9/1998 | Hales, II et al. | |
| 5,808,662 A * | 9/1998 | Kinney et al. ............ | 348/14.1 |
| 5,930,446 A * | 7/1999 | Kanda ...................... | 386/52 |
| 5,938,723 A | 8/1999 | Hales, II et al. | |
| 6,151,621 A | 11/2000 | Colyer et al. | |

(Continued)

FOREIGN PATENT DOCUMENTS

JP    8079390 A    3/1996

(Continued)

OTHER PUBLICATIONS

System and Method for Conference Call Line Drop Recovery, Vic Moore, et al.

*Primary Examiner*—David Wiley
*Assistant Examiner*—Kishin Belani
(74) *Attorney, Agent, or Firm*—Charles L. Moore; Frederick D. Bailey; Moore & Van Allen, PLLC

(57) ABSTRACT

A method for conferencing may include monitoring a status of participants in a conference and recording the conference in response to at least one participant being disconnected or exiting the conference. Another embodiment of the present invention may also include transmitting a re-invite signal to any participant that is disconnected or exits the conference in response to the participant being reconnectable or transmitting a request to rejoin the conference. A further embodiment of the present invention may include replaying a recording of the conference from a disconnect or exit time to a present time for each participant, that is involuntarily disconnected or exits the conference and communicates an indication of an intent to return, in response to a rejoining participant rejoining the conference.

39 Claims, 7 Drawing Sheets

U.S. PATENT DOCUMENTS

| | | |
|---|---|---|
| 6,163,692 A | 12/2000 | Chakrabarti et al. |
| 6,249,570 B1 | 6/2001 | Glowny et al. |
| 6,298,129 B1 | 10/2001 | Culver et al. |
| 6,501,739 B1 | 12/2002 | Cohen |
| 6,556,670 B1* | 4/2003 | Horn ................ 379/202.01 |
| 7,003,286 B2* | 2/2006 | Brown et al. ............ 455/416 |
| 7,085,558 B2* | 8/2006 | Berstis et al. ............ 455/416 |
| 2001/0036835 A1 | 11/2001 | Leedom, Jr. |
| 2002/0076025 A1* | 6/2002 | Liversidge et al. .... 379/202.01 |
| 2002/0136382 A1 | 9/2002 | Cohen et al. |
| 2002/0172498 A1* | 11/2002 | Esenyan et al. ............ 386/69 |
| 2002/0191952 A1* | 12/2002 | Fiore et al. ................ 386/46 |
| 2004/0042103 A1* | 3/2004 | Mayer ......................... 360/7 |
| 2004/0203677 A1* | 10/2004 | Brown et al. ............ 455/416 |
| 2004/0235509 A1* | 11/2004 | Burritt et al. ............ 455/519 |
| 2005/0233736 A1* | 10/2005 | Berstis et al. ............ 455/416 |

FOREIGN PATENT DOCUMENTS

| | | |
|---|---|---|
| WO | WO 99/17235 | 4/1999 |
| WO | WO 0152513 A1 | 8/2001 |

* cited by examiner

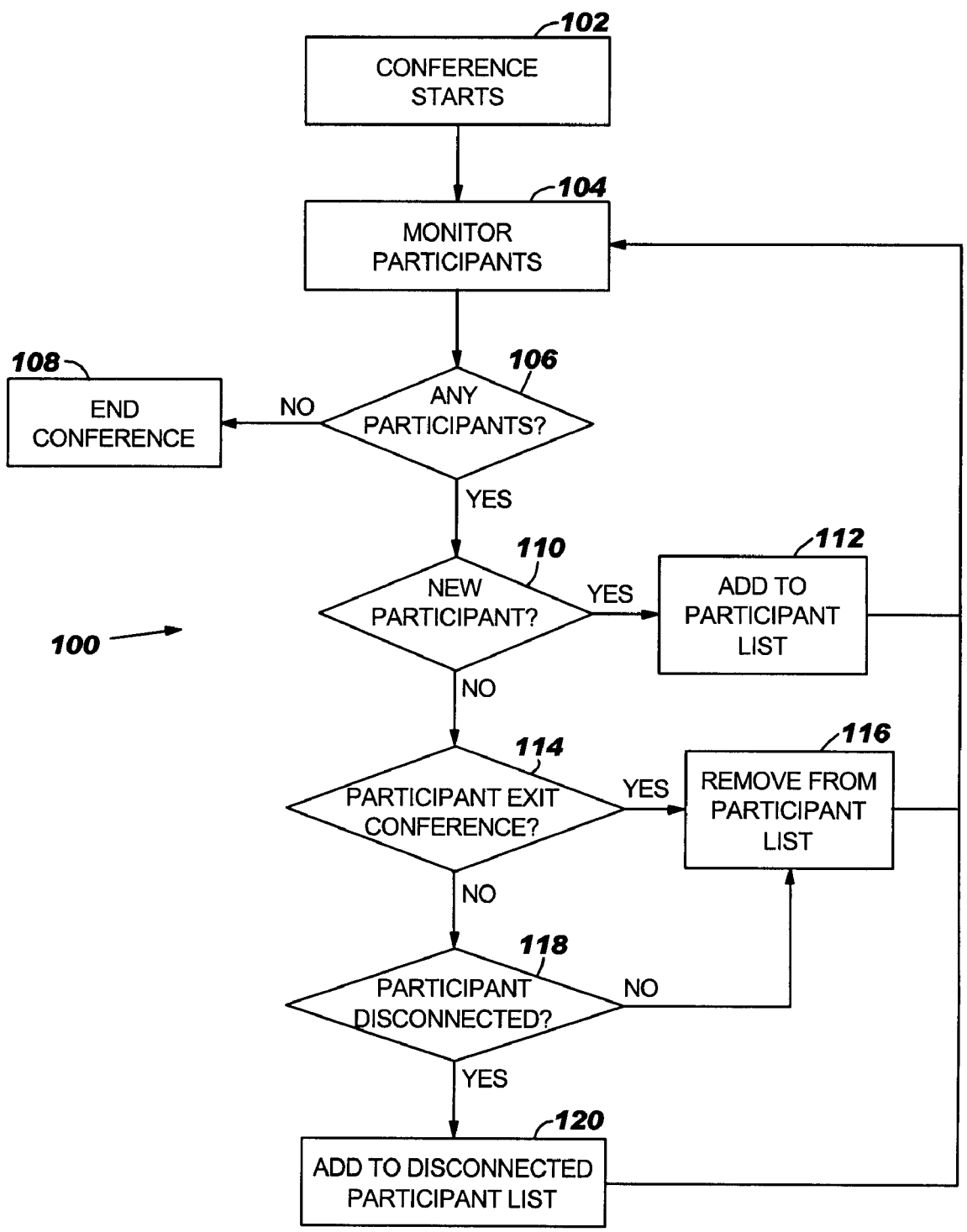

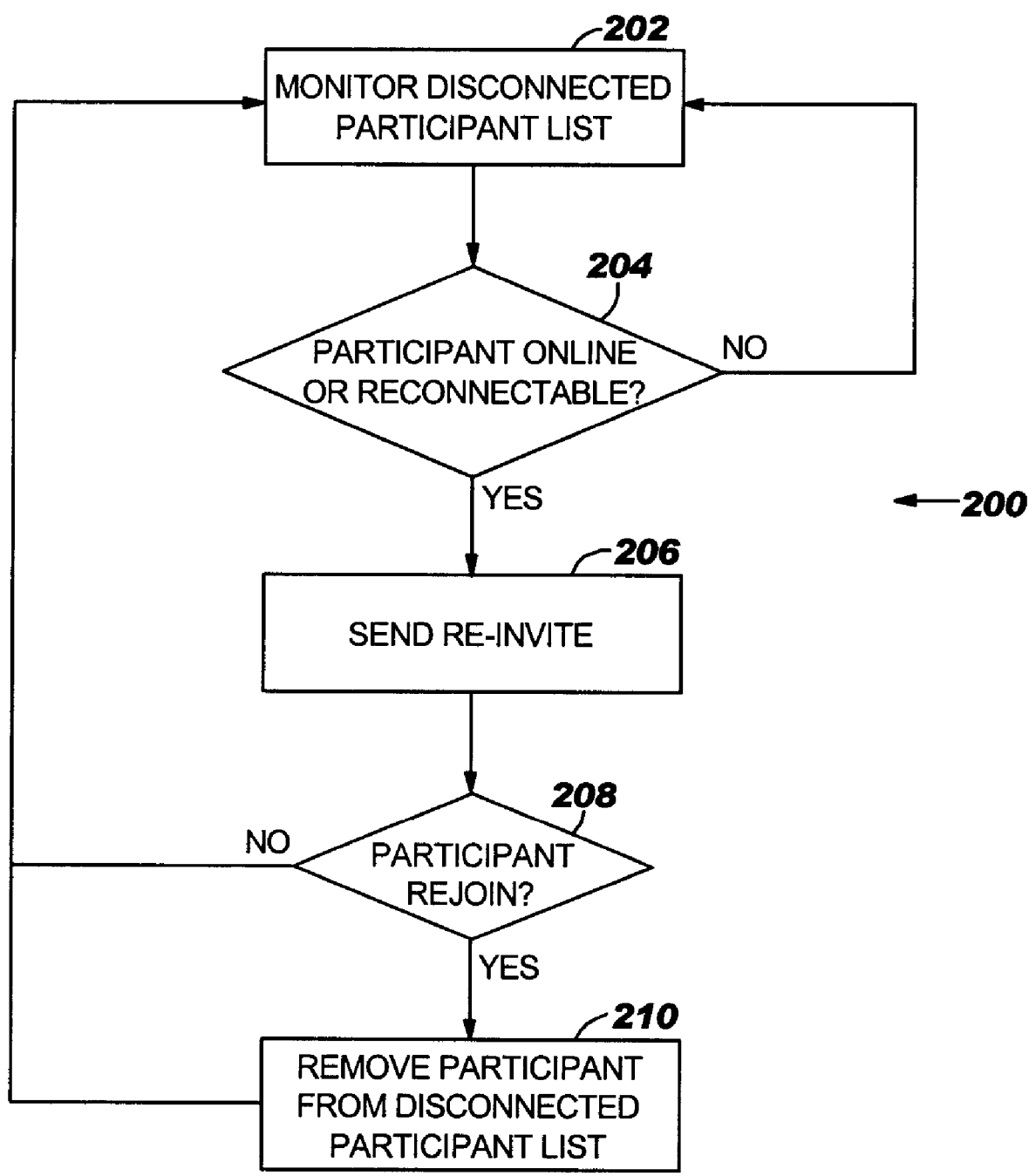

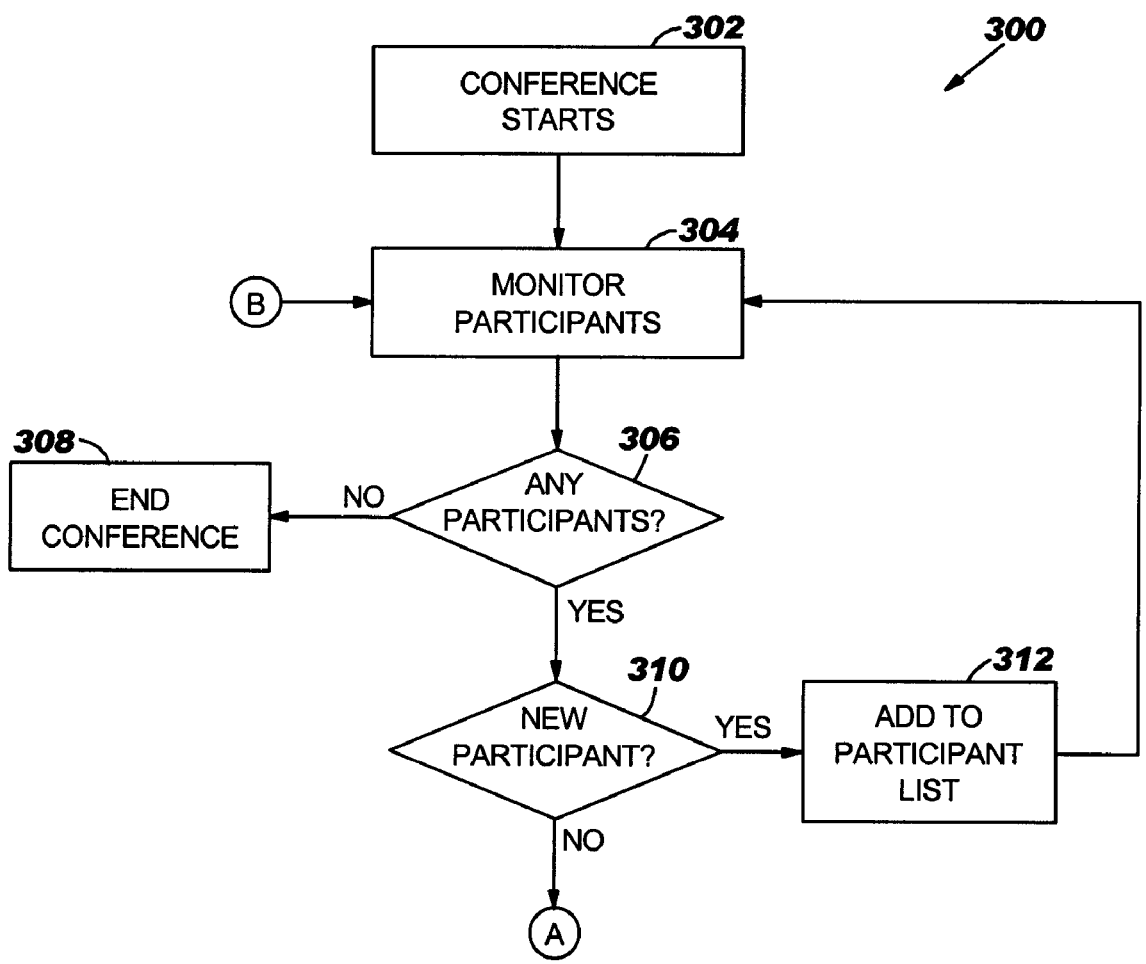

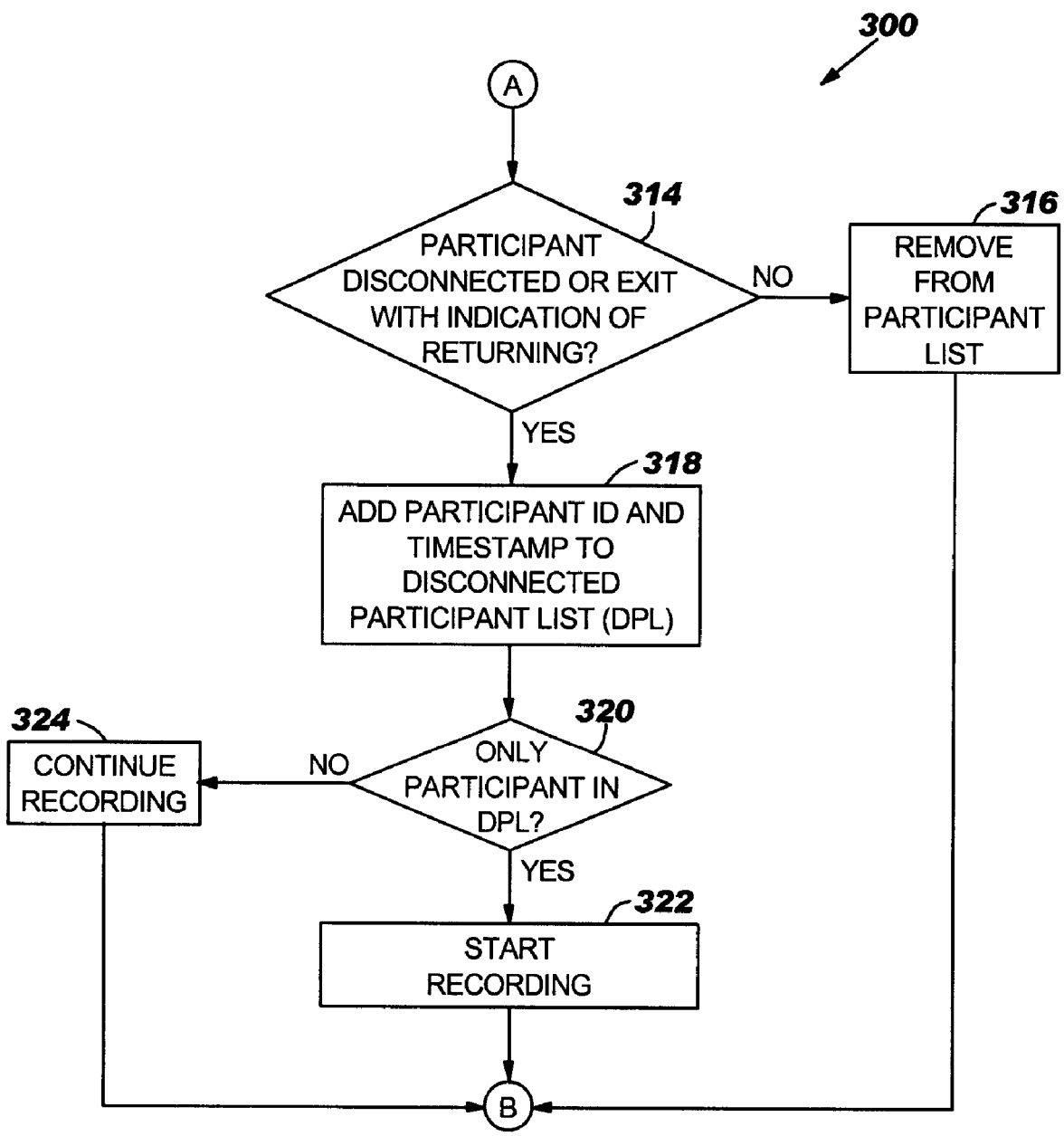

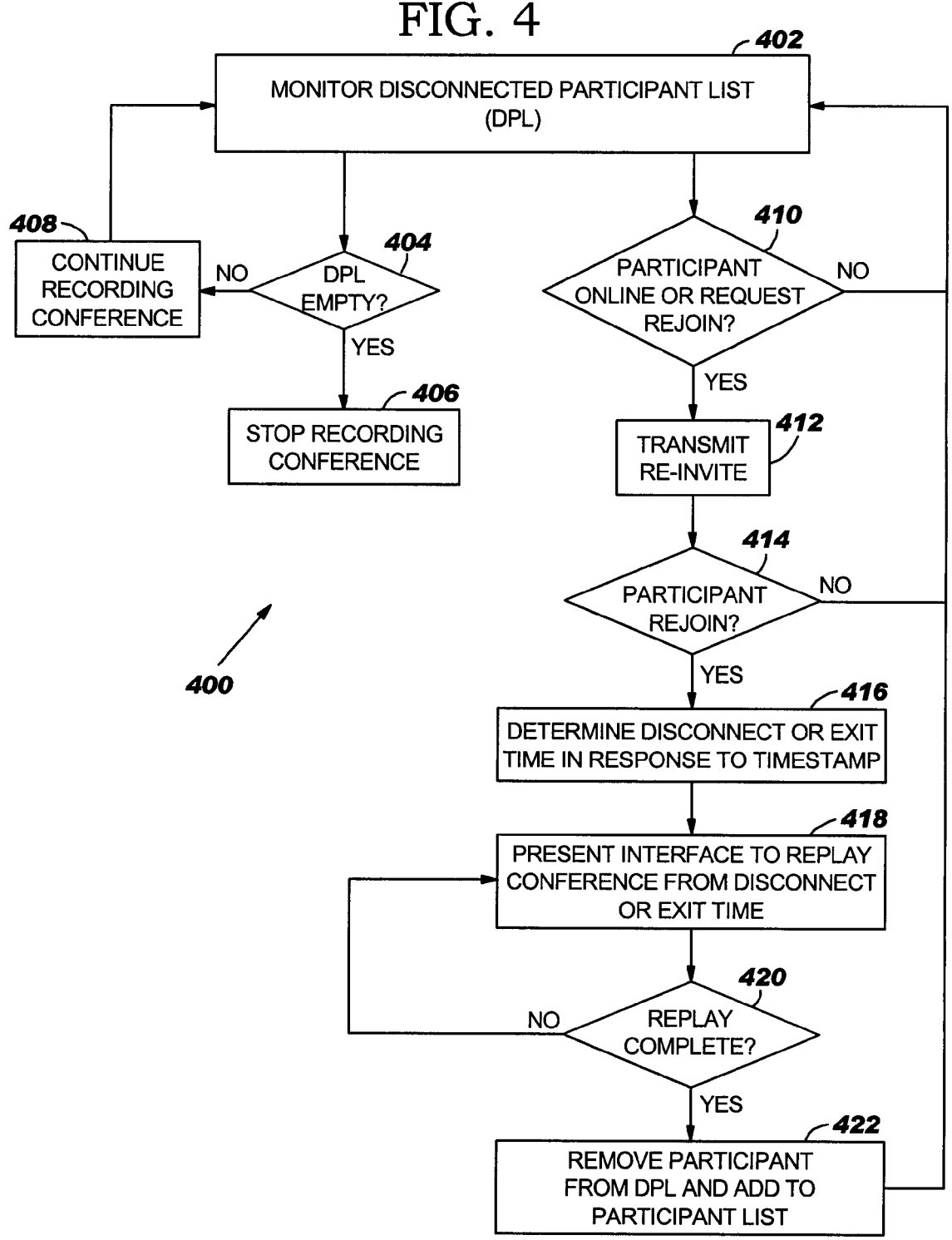

METHOD AND SYSTEM FOR PARTICIPANT AUTOMATIC RE-INVITE AND UPDATING DURING CONFERENCING

BACKGROUND OF INVENTION

The present invention relates to conferencing, especially conferencing using electronic means or media, and more particularly to a method and system for conferencing including an auto-reinvite feature and a feature to bring any disconnected and rejoining conferencee or participant up-to-speed or current with the proceeding of the conference.

Conferencing tools or means, web conferencing software or the like, such as videoconferencing tools or elements, audio or teleconferencing tools or elements, instant messaging, instant relay chat, e-meeting and the like, typically have an option to start a meeting with two or more participants. One of the participants may typically be required to be the meeting initiator. After such a web conference, teleconference or virtual meeting starts, participants or users may leave or exit the meeting or get disconnected from the meeting due to a network problem or for some other technical or non-technical reason. Current conferencing methods and systems do not provide provisions for a participant that gets disconnected to rejoin the meeting or conference unless the meeting initiator sends a manual invitation again. Additionally, current conferencing methods and system do not have provisions for a participant that voluntarily exits or leaves a web conference to return and rejoin the meeting. As a result, it is very inconvenient for a participant or user to rejoin the web conference, teleconference or virtual meeting.

The same problem can occur in telephone conference calls when a participant on a cell phone or other communication device loses signal temporarily or is otherwise disconnected or dropped.

Further, current conferencing methods and systems do not provide provisions for a participant to automatically and efficiently be brought "up-to-speed" or current on what was missed from the time the participant was disconnected or exited the conference and when the participant was able to rejoin the conference or meeting.

SUMMARY OF INVENTION

In accordance with an embodiment of the present invention, a method for conferencing may include monitoring a status of participants in a conference and transmitting a re-invite signal to any participant that is disconnected from the conference in response to the participant being reconnectable.

In accordance with another embodiment of the present invention, a method for conferencing may include monitoring a status of each participant in a conference. The method may also include adding a participant to a disconnected participant list in response to the participant being disconnected. The method may further include recording the conference in response to at least one participant being in the disconnected participant list.

In accordance with another embodiment of the present invention, a method for conferencing may include transmitting a re-invite signal to any participant that is disconnected or exits the conference in response to the participant being reconnectable or requesting to rejoin the conference. The method may also include replaying a recording of the conference from a disconnect time or exit time to a present time in response to the participant rejoining the conference.

In accordance with another embodiment of the present invention, a system for conferencing may include at least one server. A conferencing program or function may be operable on the at least one server to monitor a status of participants in a conference.

In accordance with another embodiment of the present invention, a method for making a system for conferencing may include providing at least one server. The method may also include providing a conferencing program or function operable on the at least one server to monitor a status of participants in a conference.

In accordance with another embodiment of the present invention, a computer readable medium having computer-executable instructions for performing a method that may include monitoring a status of participants in a conference. The method may further include transmitting a re-invite signal to any participant that is disconnected from the conference in response to the participant being able to rejoin the conference.

BRIEF DESCRIPTION OF DRAWINGS

FIG. 1 is a flow chart of a method for conferencing in accordance with an embodiment of the present invention.

FIG. 2 is a flow chart of a method for conferencing in accordance with another embodiment of the present invention that may be used in conjunction with the method of FIG. 1.

FIGS. 3A and 3B (collectively FIG. 3) are a flow chart of a method for conferencing in accordance with another embodiment of the present invention.

FIG. 4 is a flow chart of a method for conferencing in accordance with another embodiment of the present invention that may be used in conjunction with FIGS. 3A and 3B.

DETAILED DESCRIPTION

Figure 5:
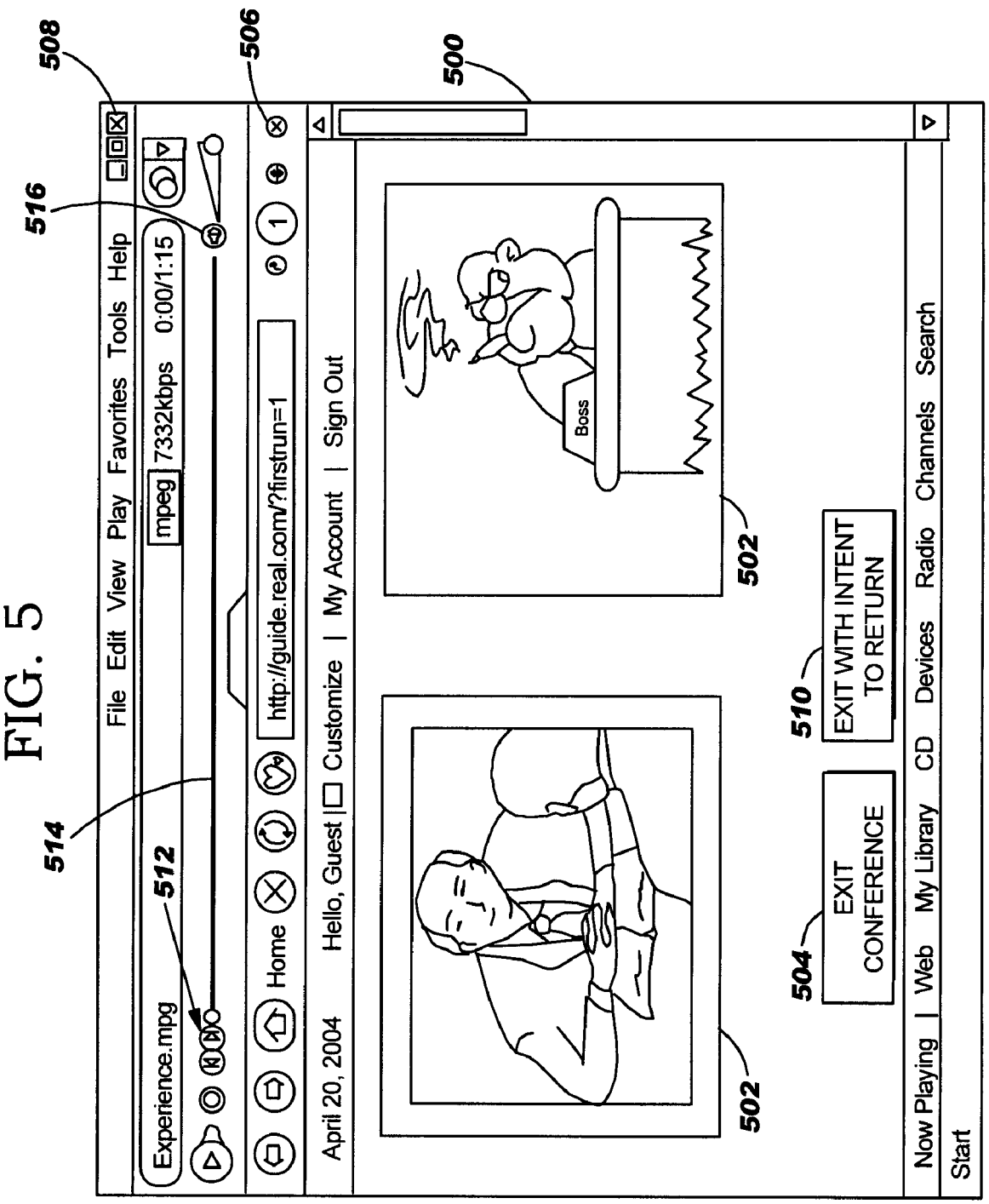
FIG. 5 is an example of an interface that may be used for a web-based video conference and to replay a recording of the conference to a participant in response to the participant rejoining the conference in accordance with an embodiment of the present invention.

The following detailed description of preferred embodiments refers to the accompanying drawings which illustrate specific embodiments of the invention. Other embodiments having different structures and operations do not depart from the scope of the present invention.

FIG. 1 is a flow chart of a method 100 for conferencing in accordance with an embodiment of the present invention. In block 102, the conference may be started or commenced. The conference or meeting may be via electronic media, such as a web-based video conference, audio or teleconference, instant messaging, Internet Relay Chat or the like or a combination of any of these types of conferencing or meeting means. In block 104, a status of each of the participants may be monitored. The participants may be monitored to determine if they are still connected or online. There are various methods for detecting lost network connectivity or to detect if a user or participant has been disconnected or for whatever reason is no longer online or participating. A feature similar to that currently available in instant messaging and web-conferencing software may be used to detect the presence or absence of a user or participant. Other techniques may include sending a periodic "heartbeat" or "I am alive" message or signal to a meeting server. Alternatively, the meeting server may periodically poll the clients or participants; accordingly, a disconnected participant may be identified or determined when the server does not receive a return signal indicating that the client or participant is still connected. The meeting server may also detect or a signal may be sent to the server in response to a participant voluntarily leaving the meeting or conference, such as by closing a web-conference window or by explicitly clicking on a button in the meeting client's graphical user interface (GUI) as discussed in more detail below.

In block 106, a determination may be made if there are any participants in the conference. If there are no participants present, the conference may end at block 108 and all network connectivity that may have been established for the conference may be broken down or disconnected. If there are participants, the method 100 may advance to block 110 and a determination may be made if any new participants have joined the meeting or conference. Any new participants may send an identifying signal or message upon joining the meeting or conference. The identifying signal or message may the same or a similar signal in response to a polling signal from a meeting server or similar to the periodic "heartbeat" signal. An identification for any new participants may be added to a participant list in block 112. The method 100 may then continue to monitor the participants in block 104. If no new participants have joined the conference or meeting in block 110, the method 100 may advance to block 114.

In block 114, a determination may be made whether a participant has exited or left the meeting. The participant may click on an appropriate button in a web-conference window to indicate an intention to leave or exit the meeting or conference. The participant may also simply close the window or graphical user interface (GUI) to exit or leave the conference. The participant may also exit or leave the conference by hanging up, going "on-hook", operating an end key or the like on a communication device, such as a cell phone, personal digital assistant, communicator or other fixed or mobile communications device. As will be discussed below, in at least one embodiment of the present invention, exiting or leaving the meeting with an indication of an intention to return may start a recording of the conference that a returning participant may replay to be brought up-to-speed or current with the meeting or conference activity.

If a participant exits or leaves the meeting, the participant may be removed from the participant list in block 116. If the participant has not voluntarily exited or left the meeting or conference, a determination may be made if the participant has been involuntarily disconnected in block 118. If the participant has not been involuntarily disconnected in block 118, the method 100 may advance to block 116 and the participant may be removed from the participant list. The method 100 may then return to block 104 where the participants may be monitored and the method 100 may continue as previously described.

If the participant has been involuntarily disconnected in block 118, the participant may be added to a disconnected participant list in block 120. The method 100 may then return to block 104 where the participants may be monitored and the method may continue as previously described.

FIG. 2 is a flow chart of a method 200 for conferencing in accordance with another embodiment of the present invention that may be used in conjunction with the method 100 of FIG. 1. In block 202, a disconnected participant list may be monitored. In block 204, a determination may be made whether a participant in the disconnected participant list is online or able to be reconnected to the conference. The method 200 may determine that the participant is online or able to be reconnected to the conference by detecting a signal, such as the "heart beat" or "I am alive" signal from the participant or by receiving a response to a polling signal sent by a conferencing server. If a determination is made that the participant is online or reconnectable in block 204, a re-invite signal or message may be sent to the participant in block 206. The re-invite signal or message may be sent automatically by the method 200 or conferencing software or program in response to determining that the disconnected participant is online or reconnectable without any intervention or action by another conference participant, conference administrator or conference initiator.

In block 208, a determination may be made whether the participant accepted the re-invitation and rejoined the conference. If the determination is that the participant did not rejoin the conference, the method 200 may return to block 202 and the method 200 may proceed as previously described. If the participant is determined to have rejoined the conference in block 208, the method 200 may advance to block 210 and the rejoining participant may be removed from the disconnected participant list. The method 200 may then return to block 202 to continue monitoring the disconnected participant list and the method 200 may proceed as previously discussed.

FIGS. 3A and 3B are a flow chart of a method 300 for conferencing in accordance with an embodiment of the present invention. In block 302, the conference or meeting may start. The conference or meeting may be via electronic media, such as a web-based video conference, audio or teleconference, instant messaging, Internet Relay Chat or the like or a combination of any of these types of conferencing or meeting means. In block 304, each of the participants may be monitored. The participants may be monitored to determine if they are still connected or online. The participants may be monitored similar to that described with respect to block 104 in FIG. 1.

In block 306, a determination may be made if there are any participants in the conference. If there are no participants present, the conference may end in block 308 and all network connectivity that may have been in established for the conference may be broken down or disconnected. If there are participants, the method 300 may advance to block 310 and a determination may be made if any new participants have joined the meeting or conference. Any new participants may send an identifying signal or message upon joining the meeting or conference. The identifying signal or message may the same or a similar signal in response to a polling signal from a meeting server or similar to the periodic "heartbeat" signal. An identification for any new participants may be added to a participant list in block 312. The method 300 may then continue to monitor the participants in block 304. If no new participants have joined the conference or meeting in block 310, the method 300 may advance to block 314 (FIG. 3B).

In block 314, a determination may be made whether a participant has been disconnected, exited or left the meeting with any indication of returning. The participant may click on an appropriate button in a web-conference window to indicate an intention one way or another whether the participant has an intention to return to the meeting at a later time. The participant may also simply close the window or graphical user interface (GUI) to exit or leave a meeting without indicating or transmitting a signal indicating an intention to later return. Alternatively, the conferencing software may include a feature or may be set by default to send an indication that the participant may intent to return in response to the participant closing the window or GUI. As will be discussed below, exiting or leaving the meeting with an indication of an intention to return may start a recording of the conference that a returning participant may replay to be brought up-to-speed or current with the meeting or conference activity.

If a participant exits or leaves the conference without an indication of returning, the participant may be removed from the participant list in block 316. If the participant is disconnected, exits or leaves the conference with an indication of returning in block 314, the method may advance to block 318. In block 318, an identification (ID) for the disconnected or exiting participant and a timestamp may be added to a disconnected participant list (DPL). The timestamp may indicate a time or correspond to a time when the participant was disconnected or exited the meeting with an intention to return. As will be discussed, the recording of the conference may then be replayed to a returning or rejoining participant from the time the participant was disconnected or exited the conference based on the timestamp.

A determination may be made in block 320 whether the participant added to the DPL is the only participant in the DPL or whether a previous participant has been added to start a recording of the conference. If the participant is the only participant in the DPL, indicating no previous participants, the method 300 may advance to block 322. In block 322 a recording of the conference proceedings may be started to replay to the participant in the event the participant rejoins the conference. The method 300 may then return to block 304 where the participants may be monitored as previously described. If the participant is not the only participant in the DPL in block 320, this indicates that a recording of the conference may have previously been started and the method 300 may advance to block 324. In block 324, recording of the conference may continue. The method 300 may then return to block 304 where the participants may be monitored as previously described. In an alternate embodiment, a recording of the conference may be started when the conference commences and any disconnected participant or participant that exits or leaves with or without an intent to return may be added to the disconnected participant list with a timestamp to permit the recording to be replayed upon the participant rejoining the conference.

FIG. 4 is a flow chart of a method 400 for conferencing in accordance with another embodiment of the present invention that may be used in conjunction with the method 300 in FIGS. 3A and 3B. In block 402, a disconnected participant list may be monitored. The disconnected participant list may be the same disconnected participant list from block 318 of FIG. 3B. In block 404, a determination may be made if the disconnected participant list (DPL) is empty. If the DPL is empty, the recording of the conference may be stopped in block 406. If the DPL is not empty in block 404, the recording of the conference may be continued in block 408 and the method 400 may return to block 402 where the disconnected participant list is monitored.

In block 410, a determination may be made whether a participant in the disconnected participant list is online or has sent a request to rejoin the conference or meeting. If a participant in the DPL has not been reconnected, online or sent a request to rejoin, the method 400 may return to block 402 and continue to monitor the DPL. If a determination has been made in block 410 that the participant has been reconnected or is online or has sent a request to rejoin the conference in block 410, a re-invite message or signal may be sent to the participant in block 412. The re-invite signal or message may be sent automatically by the method 400 or the conferencing program without any intervention or action by another conference participant, conference administrator or conference initiator. In block 414, a determination may be made whether the participant has rejoined the meeting or conference. If the participant has not rejoined the conference, the method 400 may return to block 402 and continue to monitor the DPL. If a determination has been made that the participant has rejoined the conference in block 414, the disconnect or exit time for the rejoining participant may be determined in block 416. The disconnect or exit time may be determined from the timestamp or in response to the timestamp that is associated with the rejoining participant in the DPL.

In block 418, an interface may be presented to the rejoining participant to replay the conference from the disconnect or exit time to a current or present time. The interface may be a web page or GUI that permits the rejoining participant to control the replay of the conference to bring the participant up-to-speed or current with the conference. The interface may also be embodied in using keys on a communication device without a video capability that a participant can operate to listen to the recording of the conference to be brought current with the conference proceedings. In block 420, a determination may be made whether the replay is complete. If the replay is not complete or the participant has not otherwise indicated that the replay is completed or skipped the replay, the method 400 will continue to present the interface in block 418. If the replay is complete in block 420, the rejoining participant may be removed from the disconnected participant list (DPL) and added to the participant list in block 422. The method 400 may then return to block 402 where the disconnected participant list may be monitored and the method 400 may continue as previously described. The recording may be deleted after the replay if there are no other participants in the disconnected user list. Alternatively, the recording may be saved for a predetermined period of time after the conference ends so that participants on the disconnected user list or, in another embodiment of the present invention, any participant may replay the recording of the conference. In another embodiment of the present invention, the recording may also be used to bring a late joining participant up-to-speed with the conference before actually joining the live conference.

FIG. 5 is an example of an interface 500 that may be used for a web-based video conference and to replay a recording of the conference to a participant in response to the participant rejoining the conference in accordance with an embodiment of the present invention. The interface 500 may be a web page, graphical user interface (GUI) or the like to permit a participant to view and interact in a web conference or the like. The interface 500 may include provisions to display images 502 of other conference participants if the communication devices the other participants are using include a video capability. Otherwise, if the participant is on a communication device without a camera or video capability only the participant's voice may be heard. The interface 500 may also include radio buttons or other means to permit a participant to exit the conference. The participant may operate an "EXIT CONFERENCE" button 504 or a similarly labeled button if the participant desires to exit the conference without an intent to return at later time. The participant may also simply click on one of the window close symbols 506 or 508 to exit the conference without sending an indication of a intention to return. The participant may click on or operate a button 510 that may be labeled "EXIT WITH INTENT TO RETURN" or a similarly labeled button, if the participant desires to exit the conference temporarily but desires to return at a later time. As previously discussed, operating a button, such as button 510 indicating an intent to return, may transmit a signal of such indication to the conferencing software to start a recording of the conference and to add the participant to a disconnected participant list.

The interface 500 or a similar interface may be used to control replaying the conference. The interface 500 may include buttons 512 to control rewinding, fast forward, pause and normal play of the replay or recording. A slider bar 514 may also be included to control moving to specific locations within the recording. A volume control 516 may also be included. The interface 500 may be similar to any sort of web-based video streaming interface, such as RealPlayer available from Real.com or the like.

Figure 6:
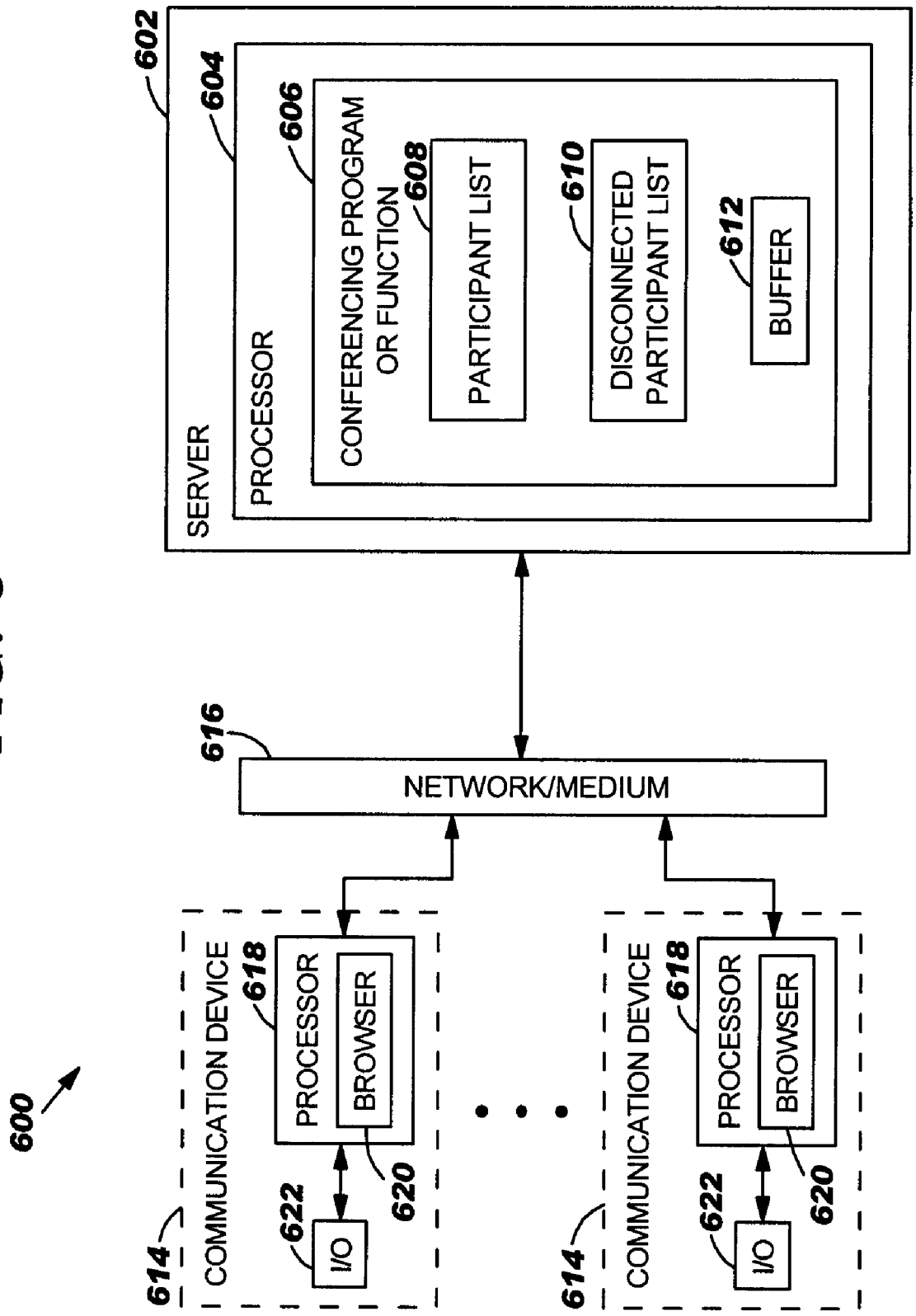
FIG. 6 is an example of a system for conferencing in accordance with an embodiment of the present invention.

FIG. 6 is an example of a system 600 for conferencing in accordance with an embodiment of the present invention. The methods 100 and 200 of FIGS. 1 and 2, methods 300 and 400 of FIGS. 3 and 4 and the means to create the interface 500 of FIG. 5 may be embodied in the system 600. The system 600 may include at least one server 602. Other servers may be included depending upon the need for additional capacity and other system or user requirements. The server 602 may include a processor 604. A conferencing program or function 606 may run on the processor 604 or server 602. Elements of the conferencing program or function may include the methods 100 and 200 of FIGS. 1 and 2, methods 300 and 400 of FIGS. 3 and 4, and the interface 500 of FIG. 5. The conferencing program or function 606 may include a capability of forming a participant list 608. As previously described a participant list 608 may be maintained to facilitate monitoring all participants in a conference or meeting. The conference program or function 606 may also include a disconnected participant list 610. As previously described, the disconnected participant list 610 may include an identification of any participants that have been involuntarily disconnected from a conference or exited or left the conference with an intention to return. The disconnected participant list 610 may also include a timestamp associated with each participant in the disconnected participant list 610 indicating or corresponding to a time when the participant was disconnected or exited the conference. The conference program or function 606 may also include a buffer 612 to store or make a recording of the conference for replay to any disconnected participants or participants who exited the conference and communicated an indication of an intention to return. The buffer 612 may be any type of recording or storage device capable of recording or storing audio, video or a combination of audio and video information. The participant list 608, disconnected participant list 610 and buffer 612 may be contained on the same or different data storage devices.

Users or participants may access the conferencing program or function 606 using a communication device 614 via a network or medium 616. The communication device 614 may be any type of communication device, including but not limited to a computer, personal digital assistant, communicator, cell phone, wired or wire line phone or the like. The communication device 614 may include a processor 618 to control operation of the communication device 614. A browser 620 may operate or run on the communication device processor 618 to access the network or medium 616 and the conferencing program or function 606. The communication device 614 may also include input and output (I/O) devices 622 or combination I/O devices to permit a user or participant to operate and interface with the communication device 614. The I/O devices 622 may include a keyboard or keypad, pointing device, display or monitor, disk drives, optical, mechanical, magnetic, or infrared input/output devices, voice recognition system or the like.

The network or medium 614 may be the Internet or a private network, such as an intranet or the like. The communication network or medium 614 may be any communication system including by way of example, dedicated communication lines, telephone networks, and wireless data transmission systems, two-way cable systems, and customized computer networks, interactive kiosk networks, the Internet and the like.

Elements of the present invention, such as methods 100 and 200 of FIGS. 1 and 2 respectively, methods 300 and 400 of FIGS. 3A, 3B and 4 respectively, interface 500 of FIG. 5 and system 600 of FIG. 6, may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in a medium for use by or in connection with a system, such as system 600 of FIG. 6. Examples of such a medium may be illustrated in FIG. 6 as I/O devices 622 or medium 616. A computer-usable or readable medium may be any medium that may contain, store, communicate or transport the program for use by or in connection with a system. The medium, for example, may be an electronic, magnetic, optical, electromagnetic, infrared or semiconductor system or the like. The medium may also be simply a stream of information being retrieved when the computer program product is "downloaded" through a network, such as the Internet or the like. The computer-usable or readable medium could also be paper or another suitable medium upon which the program may be printed.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method for conferencing, comprising:
monitoring a status of participants in a conference;
transmitting a re-invite signal to any participant that is disconnected from the conference in response to the participant being reconnectable;
recording the conference from a disconnect time of any disconnected participant in response to the disconnected participant being disconnected; and
discontinuing to record the conference and replaying the recording of the conference to the disconnected participant in response to the disconnected participant rejoining the conference.

2. The method of claim 1, further comprising transmitting the re-invite signal to any participant that exits the conference in response to the participant transmitting a request to rejoin the conference.

3. The method of claim 1, further comprising adding a participant to a disconnected participant list for each participant that is disconnected from a conference.

4. The method of claim 3, further comprising:
monitoring the disconnected participant list;
recording the conference in response to at least one participant being in the disconnected participant list; and
discontinuing to record the conference in response to the disconnected participant list being empty.

5. The method of claim 1, further comprising presenting an interface to control replaying the recording of the conference by the rejoining participant.

6. The method of claim 1, further comprising removing the rejoining participant from a disconnected participant list in response to completion of replaying the recording of the conference.

7. The method of claim 1, further comprising determining the disconnect or exit time for each rejoining participant from a timestamp associated with each rejoining participant.

8. The method of claim 1, further comprising adding each participant to a participant list in response to each participant joining the conference.

9. The method of claim 8, further comprising removing any participant from the participant list in response to the participant exiting the conference.

10. The method of claim of claim 1, wherein conferencing comprises at least one of Web-based conferencing, video conferencing, audio conferencing, teleconferencing, instant messaging and Internet Relay Chat.

11. A method for conferencing, comprising:
monitoring a status of each participant in a conference;
adding a participant to a disconnected participant list in response to the participant being disconnected;
recording the conference in response to at least one participant being in the disconnected participant list;
monitoring the disconnected participant list;
continuing to record the conference in response to at least one participant being in the disconnected participant list;
discontinuing to record the conference in response to the disconnected participant list being empty; and
replaying a recording of the conference from a disconnect time of a disconnected participant to a present time for each participant in the disconnected participant list in response to a disconnected participant rejoining the conference.

12. The method of claim 11, further comprising adding an identification and a timestamp to the disconnected participant list for each participant that is involuntarily disconnected or exits the conference and indicates an intent to return.

13. The method of claim 11, further comprising presenting an interface to the rejoining participant to control replaying the recording.

14. The method of claim 11, further comprising removing the rejoining participant from the disconnected participant list in response to completion of replaying the recording of the conference or the disconnected participant skipping replaying the recording.

15. The method of claim 11, further comprising determining the disconnect time for each rejoining participant from a timestamp associated with each rejoining participant.

16. The method of claim 11, further comprising transmitting a re-invite signal to any participant on the disconnected participant list in response to the participant being able to rejoin the conference.

17. A system for conferencing, comprising:
at least one server; and
a conferencing function operable on the at least one server to monitor a status of participants in a conference;
means for recording the conference from a disconnect time of any disconnected participant in response to the disconnected participant being disconnected; and
means for discontinuing to record the conference and replaying the recording of the conference to the disconnected participant in response to the disconnected participant rejoining the conference.

18. The system of claim 17, further comprising a participant list to store an identification of each participant in the conference.

19. The system of claim 17, further comprising a disconnected participant list to store an identification associated with each participant that is disconnected from the conference.

20. The system of claim 19, further comprising:
means for monitoring the disconnected participant list;
means for continuing to record the conference in response to at least one participant being in the disconnected participant list; and
means for discontinuing to record the conference in response to the disconnected participant list being empty.

21. The system of claim 20, means for replaying a recording of the conference from a disconnect or exit time to a present time for each participant in the disconnected participant list in response to a rejoining participant rejoining the conference.

22. The system of claim 21, further comprising an interface presentable to the rejoining participant to control replaying the recording.

23. The system of claim 21, further comprising means for removing the rejoining participant from the disconnected participant list in response to completion of replaying the recording of the conference.

24. The system of claim 17, further comprising means for transmitting a re-invite signal to any disconnected participant in response to the disconnected participant being able to rejoin the conference.

25. A method for making a system for conferencing, comprising:
providing at least one server; and
providing a conference function operable on the at least one server to monitor a status of participants in a conference
providing means to record the conference in response to at least one participant being disconnected from the conference; and
providing means for replaying a recording of the conference from a disconnect time to a current time for each participant disconnected in response to a disconnected participant rejoining the conference.

26. The method of claim 25, further comprising forming a disconnected participant list to store an identification associated with each participant that is disconnected from the conference.

27. The method of claim 26, further comprising:
providing means for monitoring the disconnected participant list;
providing means for continuing to record the conference in response to at least one participant being in the disconnected participant list; and
providing means for discontinuing to record the conference in response to the disconnected participant list being empty.

28. The method of claim 27, further comprising providing means for replaying a recording of the conference from a disconnect time to a present time for each participant in the disconnected participant list in response to a rejoining participant rejoining the conference.

29. The method of claim 28, further comprising providing means for forming an interface presentable to the rejoining participant to control replaying the recording.

30. The method of claim 28, further comprising providing means for removing the rejoining participant from the disconnected participant list in response to completion of replaying the recording of the conference.

31. The method of claim 25, further comprising providing means for transmitting a re-invite signal to any disconnected participant being able to rejoin the conference.

32. A computer-readable medium comprising one from the group consisting of an electronic medium, a magnetic medium, a semiconductor medium, having computer-executable instructions stored therein, the instructions when executed causing a processing device to perform:
   monitoring a status of participants in a conference;
   transmitting a re-invite signal to any participant that is disconnected from the conference in response to the participant being able to rejoin the conference;
   recording the conference from a disconnect time of any disconnected participant in response to the disconnected participant being disconnected; and
   discontinuing to record the conference and replaying the recording of the conference to the disconnected participant in response to the disconnected participant rejoining the conference.

33. The computer-readable medium having computer executable instructions for performing the method of claim 32, further comprising adding a participant to a disconnected participant list for each participant that is disconnected from the conference.

34. The computer-readable medium having computer executable instructions for performing the method of claim 33, further comprising:
   monitoring the disconnected participant list;
   recording the conference in response to at least one participant being in the disconnected participant list; and
   discontinuing to record the conference in response to the disconnected participant list being empty.

35. The computer-readable medium having computer executable instructions for performing the method of claim 34, further comprising replaying a recording of the conference in response to a disconnected participant rejoining the conference.

36. The computer-readable medium having computer executable instructions for performing the method of claim 35, further comprising presenting an interface to control replaying the recording of the conference by a rejoining participant.

37. The computer-readable medium having computer executable instructions for performing the method of claim 35, further comprising removing the rejoining participant from the disconnected participant list in response to completion of replaying the recording of the conference.

38. The computer-readable medium having computer executable instructions for performing the method of claim 32, further comprising adding each participant to a participant list in response to each participant joining the conference.

39. The computer-readable medium having computer executable instructions for performing the method of claim 38, further comprising removing any participant from the participant list in response to the participant exiting the conference without an indication of returning.

* * * * *